US010193112B2

(12) United States Patent
Zimbru, Jr. et al.

(10) Patent No.: US 10,193,112 B2
(45) Date of Patent: Jan. 29, 2019

(54) MODULAR ENERGY STORAGE COMPONENT ENCLOSURE

(71) Applicant: Lockheed Martin Energy, LLC, Tyler, TX (US)

(72) Inventors: George C. Zimbru, Jr., Duncanville, TX (US); Bradley Fiebig, Mansfield, TX (US); Daniel Homiak, Waxahachie, TX (US); Glen Oliver, Arlington, TX (US)

(73) Assignee: Lockheed Martin Energy, LLC, Tyler, TX (US)

( * ) Notice: Subject to any disclaimer, the term of this patent is extended or adjusted under 35 U.S.C. 154(b) by 166 days.

(21) Appl. No.: 15/094,662

(22) Filed: Apr. 8, 2016

(65) Prior Publication Data

US 2017/0294633 A1 Oct. 12, 2017

(51) Int. Cl.
*H01M 2/10* (2006.01)
*H01M 10/627* (2014.01)
*H01M 10/63* (2014.01)
*H01M 2/20* (2006.01)
*H01M 10/0525* (2010.01)
*H01M 10/06* (2006.01)

(52) U.S. Cl.
CPC ........... *H01M 2/1077* (2013.01); *H01M 2/20* (2013.01); *H01M 2/206* (2013.01); *H01M 10/0525* (2013.01); *H01M 10/06* (2013.01); *H01M 10/627* (2015.04); *H01M 10/63* (2015.04); *H01M 2220/10* (2013.01)

(58) Field of Classification Search
None
See application file for complete search history.

(56) References Cited

U.S. PATENT DOCUMENTS

| 7,548,429 B2 | 6/2009 | Miller |
| 2013/0065087 A1 | 3/2013 | Kim et al. |
| 2014/0360207 A1 | 12/2014 | Choi et al. |
| 2015/0359329 A1 | 12/2015 | Frazier |

FOREIGN PATENT DOCUMENTS

JP 60236454 A 11/1985

OTHER PUBLICATIONS

Author Unknown, "Purpose Built Enclosures," Product Specification Sheet GEA31830, GE Power & Water Renewable Energy, May 2015, General Electric Company, 1 page.

(Continued)

*Primary Examiner* — Wyatt P McConnell
(74) *Attorney, Agent, or Firm* — Withrow & Terranova, PLLC

(57) ABSTRACT

An energy storage component (ESC) enclosure is provided. The ESC enclosure includes a plurality of ESC modules. Each ESC module includes at least one side portion having a plurality of side fastening mechanisms configured to be coupled to an adjacent ESC module, wherein the plurality of ESC modules is coupled together via the plurality of side fastening mechanisms to form an ESC enclosure. The ESC enclosure further includes a plurality of shelving kits, each shelving kit mounted to one of the ESC modules. The ESC enclosure further includes a roof that is coupled to the plurality of ESC modules, and a plurality of panels coupled to the plurality of ESC modules about a perimeter of the ESC enclosure to form a shared air space within the ESC enclosure.

20 Claims, 15 Drawing Sheets

(56) References Cited

OTHER PUBLICATIONS

Author Unknown, "Powerpack: Utility and Business Energy Storage," Product Specification, Tesla, www.tesla.com/powerpack, accessed on Apr. 7, 2017, 6 pages.
International Search Report and Written Opinion for International Patent Application No. PCT/US2017/026529, dated Jul. 20, 2017, 11 pages.
International Preliminary Report on Patentability for International Patent Application No. PCT/US2017/026529, dated Oct. 18, 2018, 8 pages.

MODULAR ENERGY STORAGE COMPONENT ENCLOSURE

TECHNICAL FIELD

The embodiments relate to energy storage and, in particular, to a modular energy storage component enclosure.

BACKGROUND

Power generation facilities often need to temporarily store relatively large amounts of surplus energy. Conventional commercial energy storage systems (ESSs) typically follow a building model and are large enough for a human to enter an interior volume of the ESS, where the particular energy storage technology can be maintained and operated while protected from the environment. Unfortunately, a building model such as this implicates building codes and regulations, and adds to the cost and complexity of building an ESS. Such ESSs are also generally not scalable, so that as energy storage needs increase, it is necessary to construct more buildings. Each building has its own thermal management infrastructure, electrical distribution infrastructure, control and communications infrastructure, and the like. Constructing such buildings can take a relatively long time and can have a relatively substantial footprint, increasing space requirements.

SUMMARY

The embodiments relate to a modular energy storage component (ESC) enclosure. The ESC enclosure provides access to electric storage components from outside the ESC enclosure and is not human-occupiable, facilitating smaller and quickly deployable ESC enclosures. The embodiments are scalable, allowing existing ESC enclosures to be relatively easily enlarged in size or reduced in size as desired. An ESC enclosure is made up of multiple connected ESC modules that share infrastructure, such as thermal management and control and communications infrastructures. Each ESC module includes connectable features that facilitate connection of the ESC modules to form the ESC enclosure that has a shared air space.

In one embodiment, a method for assembling an energy storage component (ESC) enclosure is provided. The method includes determining a quantity of energy storage components to be enclosed. The method further includes selecting a particular shelving kit style of a plurality of different shelving kit styles based on a type of energy storage component to be enclosed. The method further includes determining a number N greater than 1 of a plurality of ESC modules required to enclose the quantity of energy storage components based on the shelving kit style. The method further includes placing the N number of ESC modules adjacent to one another, each ESC module including at least one side portion that is configured to be coupled to a side portion of an adjacent ESC module. The method further includes inserting into each ESC module of the N number of ESC modules a shelving kit of the particular shelving kit style. The method further includes coupling the N number of ESC modules together via respective side portions to form an ESC enclosure. The method further includes mounting a roof on the ESC enclosure, and coupling a plurality of panels completely about a perimeter of the ESC enclosure to form an enclosed shared air space within the ESC enclosure.

In another embodiment, an ESC enclosure is provided. The ESC enclosure includes a plurality of ESC modules. Each ESC module includes at least one side portion having a plurality of side fastening mechanisms configured to be coupled to an adjacent ESC module, wherein the plurality of ESC modules is coupled together via the plurality of side fastening mechanisms to form an ESC enclosure. The ESC enclosure further includes a plurality of shelving kits, each shelving kit mounted to one of the ESC modules. The ESC enclosure further includes a roof that is coupled to the plurality of ESC modules and a plurality of panels coupled to ESC modules about a perimeter of the ESC modules to form a shared air space within the ESC enclosure.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first ESC module" and "second ESC module," and does not imply a priority, a type, an importance, or other attribute, unless otherwise stated herein.

The embodiments relate to a modular energy storage component (ESC) enclosure. The ESC enclosure provides access to electric storage components from outside the ESC enclosure. The ESC enclosure lacks a center aisle sufficient to facilitate ingress by a human; it is thus not human-occupiable, facilitating smaller and quickly deployable ESC enclosures. The embodiments are easily scalable, allowing existing ESC enclosures to be relatively easily enlarged in size or reduced in size as desired. An ESC enclosure is made up of multiple connected ESC modules that share infrastructure, such as thermal management and control and communications infrastructure. Each ESC module includes connectable features that facilitate connection of the ESC modules to form the ESC enclosure that has a shared air space.

Figure 1:
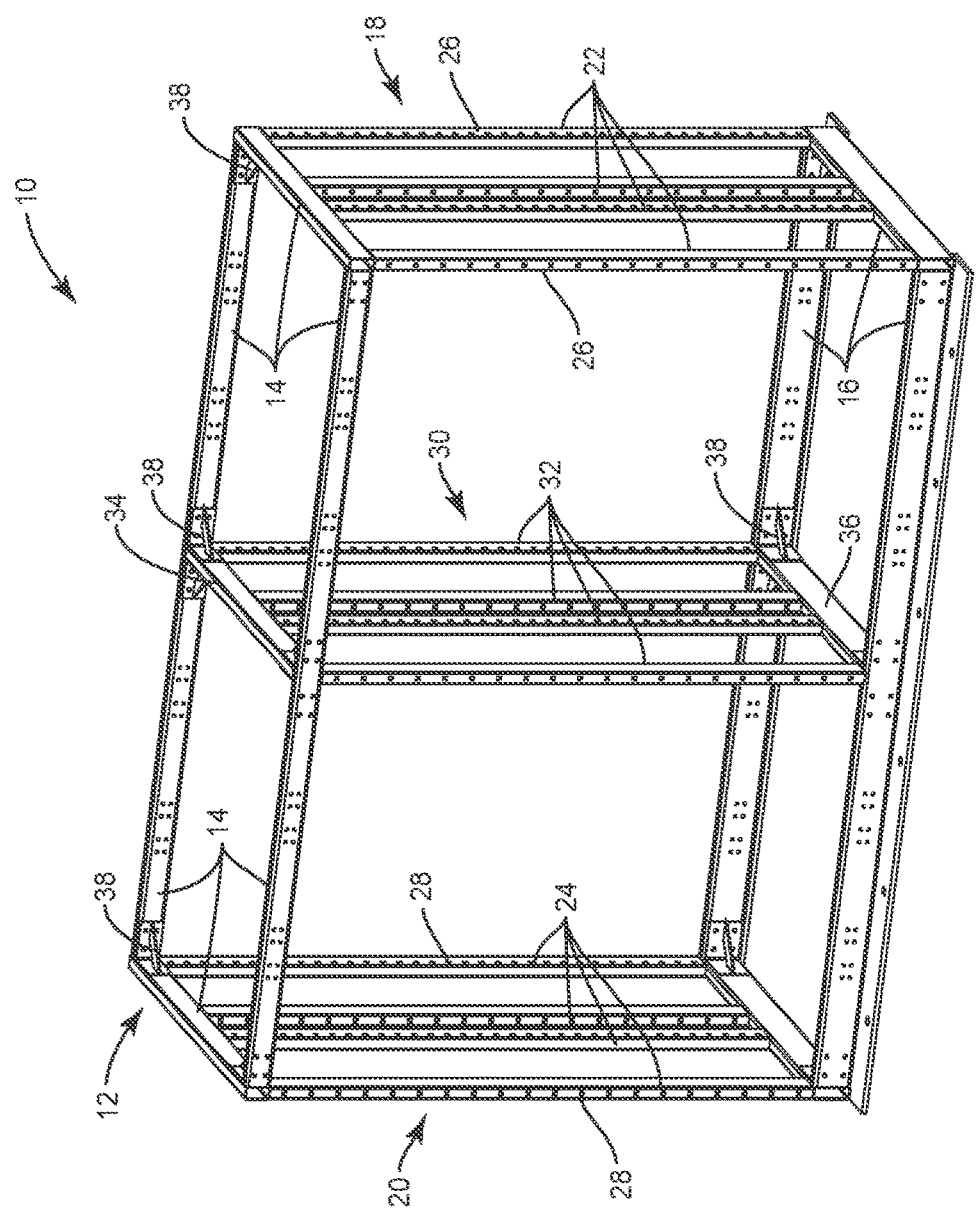
FIG. 1 illustrates an electronic storage component (ESC) module according to one embodiment.

FIG. 1 illustrates an electronic storage component (ESC) module 10 according to one embodiment. The ESC module 10 is configured to receive a plurality of different shelving kit styles. The term shelving kit styles includes racking kit styles. The shelving kits discussed herein are hot-swappable, reconfigurable, and mix and matchable. The ESC module 10 includes a frame 12 that includes a top perimeter frame 14 and a bottom perimeter frame 16. The top perimeter frame 14 and the bottom perimeter frame 16 are each rectangular. The frame 12 also includes a first side 18 and a second side 20. The first side 18 includes a plurality of first side members 22 that extend from the top perimeter frame 14 to the bottom perimeter frame 16. The second side 20 includes a plurality of second side members 24 that extend from the top perimeter frame 14 to the bottom perimeter frame 16. As will be discussed below in greater detail, the first side members 22 include first side portions 26 that have a plurality of side fastening mechanisms (not illustrated in FIG. 1) that are configured to be coupled to an adjacent ESC module 10. The second side members 24 include second side portions 28 that have a plurality of side fastening mechanisms (not illustrated in FIG. 1) that are configured to be coupled to an adjacent ESC module 10. The ESC module 10 includes a floor that is sealed, preventing water, insects, and air from entering the shared air space.

The frame 12 also includes a central upright structure 30 that includes a plurality of central upright members 32, a top cross bar 34 and a bottom cross bar 36. In this example, the frame 12 also includes a plurality of corner brackets 38 (only some of which are labelled in FIG. 1).

Figure 2:
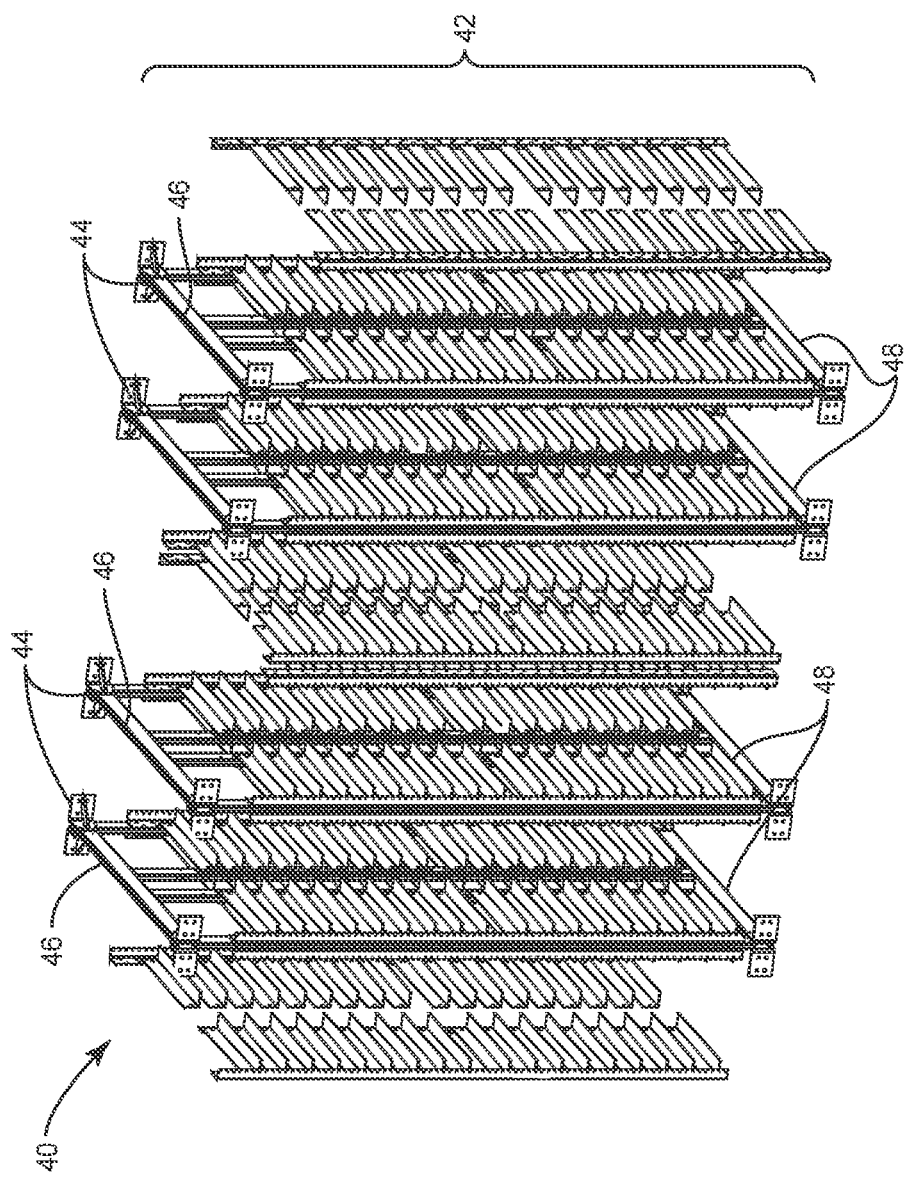
FIG. 2 illustrates a first style of a shelving kit according to one embodiment.

FIG. 2 illustrates a first style 40 of a shelving kit 42 according to one embodiment. The shelving kit 42 is configured to support a plurality of energy storage components. The energy storage components may comprise any component capable of storing energy, including, by way of non-limiting example, electro-chemical storage devices, capacitors, electromechanical storage systems, fuel cells, flow batteries, thermal-electrical storage systems, lithium ion batteries, lead acid batteries, and the like. In this example, the shelving kit 42 is configured to support a plurality of lithium ion batteries, and the first style 40 is a lithium ion battery style.

The shelving kit 42 includes a plurality of upright members 44, each upright member 44 having a top end 46 and a bottom end 48. The top end 46 of each upright member 44 can be coupled to the top perimeter frame 14 of the ESC module 10 (FIG. 1) to fix the shelving kit 42 with respect to the top perimeter frame 14. The bottom end 48 of each upright member 44 can be coupled to the bottom perimeter frame 16 of the ESC module 10 to fix the shelving kit 42 with respect to the bottom perimeter frame 16. Because the shelving kit 42 is coupled directly to the frame 12 (FIG. 1), the shelving kit 42 increases the load bearing capability, rigidity, and structural integrity of the ESC module 10.

Figure 3:
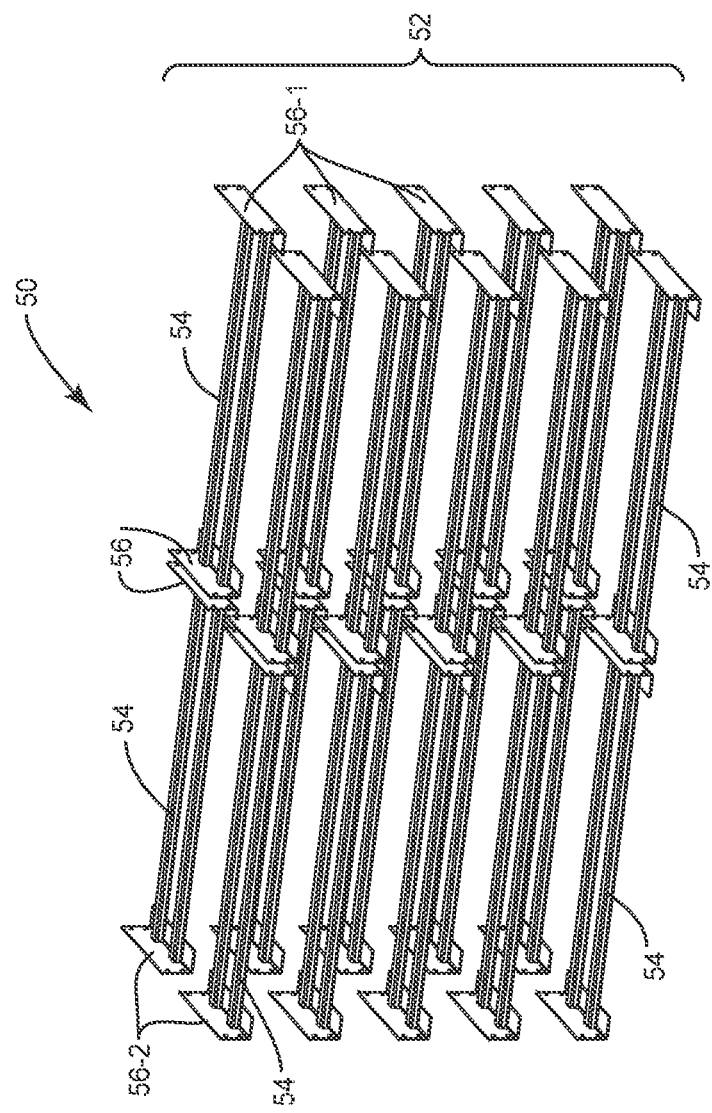
FIG. 3 illustrates a second style of a shelving kit according to another embodiment.

FIG. 3 illustrates a second style 50 of a shelving kit 52 according to one embodiment. The shelving kit 52 is configured to support a plurality of energy storage components. In particular, the shelving kit 52 is configured to support a plurality of lead acid batteries, and the second style 50 is a lead acid battery style. The shelving kit 52 comprises a plurality of shelves 54. Each shelf 54 includes a first end member 56 configured to be coupled to the central upright structure 30 of the ESC module 10 (FIG. 1). Some of the shelves 54 include second end members 56-1 that are configured to be coupled to the first side members 22 of the ESC module 10. Other of the shelves 54 include second end members 56-2 that are configured to be coupled to the second side members 24 of the ESC module 10. As discussed above with regard to FIG. 2, because the shelving kit 52 is coupled directly to the frame 12 (FIG. 1), the shelving kit 52 increases the load bearing capability, rigidity, and structural integrity of the ESC module 10.

Figure 4:
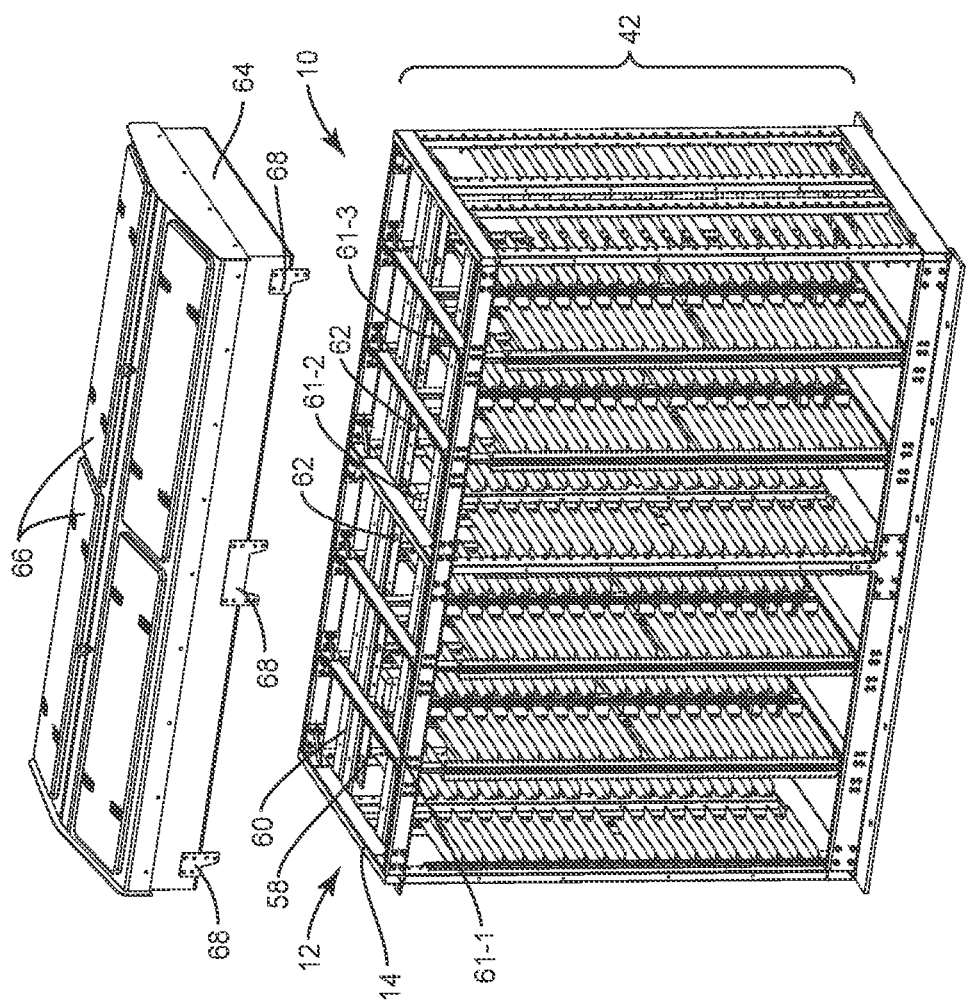
FIG. 4 illustrates the ESC module with an installed shelving kit according to one embodiment.

FIG. 4 illustrates the ESC module 10 with the shelving kit 42 installed such that the shelving kit 42 is fixed with respect to the frame 12 of the ESC module 10. The ESC module 10 includes a plurality of power busses 58 that are configured to carry electrical energy to and from the energy storage components. In this example, the power busses 58 hang from support members 60 and are electrically insulated from the support members 60 via a plurality of insulators 62. The power busses 58 may comprise, by way of non-limiting example, cables, switch gear, conduit and fluidic media, wireless busses, and the like. The ESC module 10 also includes a plurality of sensors 61-1-61-3, each of which may be configured to identify a characteristic of the shared air space of multiple ESC modules 10 coupled together to form an ESC enclosure. The plurality of sensors 61-1-61-3, may comprise, by way of non-limiting example, one or more of a smoke sensor, a hydrogen sensor, a humidity sensor, a temperature sensor, or a gas sensor. The characteristic thus may comprise, by way of non-limiting example, whether smoke is present in the shared air space, a temperature of the shared air space, a humidity of the shared air space, a pressure of the shared air space, whether hydrogen or some other gas is present in the shared air space, and the like.

A roof 64 is configured to be mounted to the ESC module 10. The roof 64 forms a void in which a thermal management system can be located to thermally manage the shared air space. The thermal management system may comprise, for example, a chilled water system, a heating, ventilating and cooling (HVAC) system, or the like. The roof 64 includes one or more removable panels 66 that can be used to access the thermal management system after the roof 64 has been mounted to the ESC module 10. The roof 64 includes a plurality of connection members 68 that form openings and that are located at positions to align with openings in the top perimeter frame 14. In some embodiments, the ESC modules 10 can be stacked, and the ESC modules 10 may include a mating structure to support another vertically positioned ESC module 10.

Figure 5:
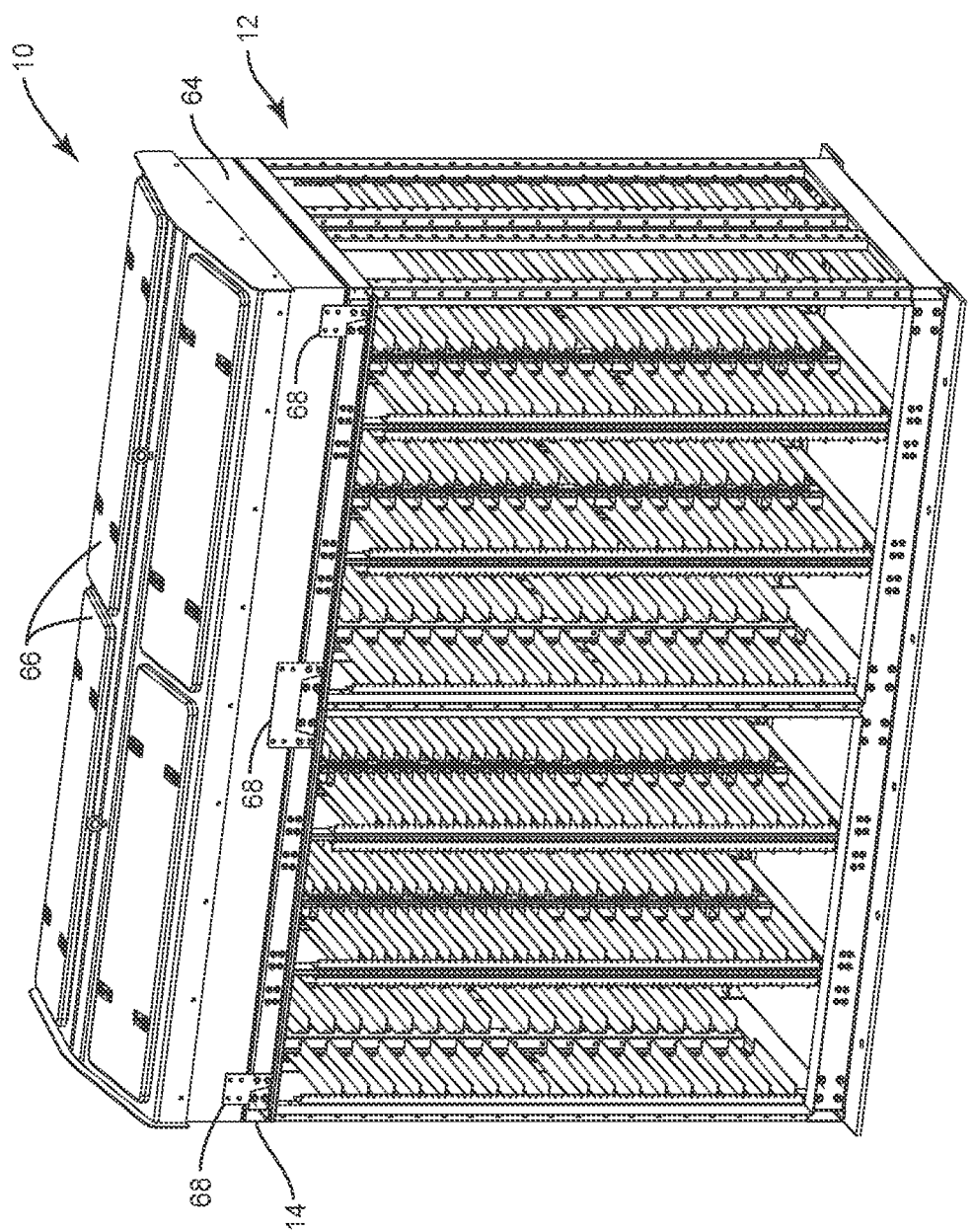
FIG. 5 illustrates a roof coupled to a frame according to one embodiment.

FIG. 5 illustrates the roof 64 coupled to the frame 12 according to one embodiment. Note that the connection members 68 are fixed to the top perimeter frame 14 to fix the roof 64 to the frame 12. A gasket (not illustrated) may be positioned about a top edge of the top perimeter frame 14 between the roof 64 and the top perimeter frame 14 to form a seal.

Figure 6:
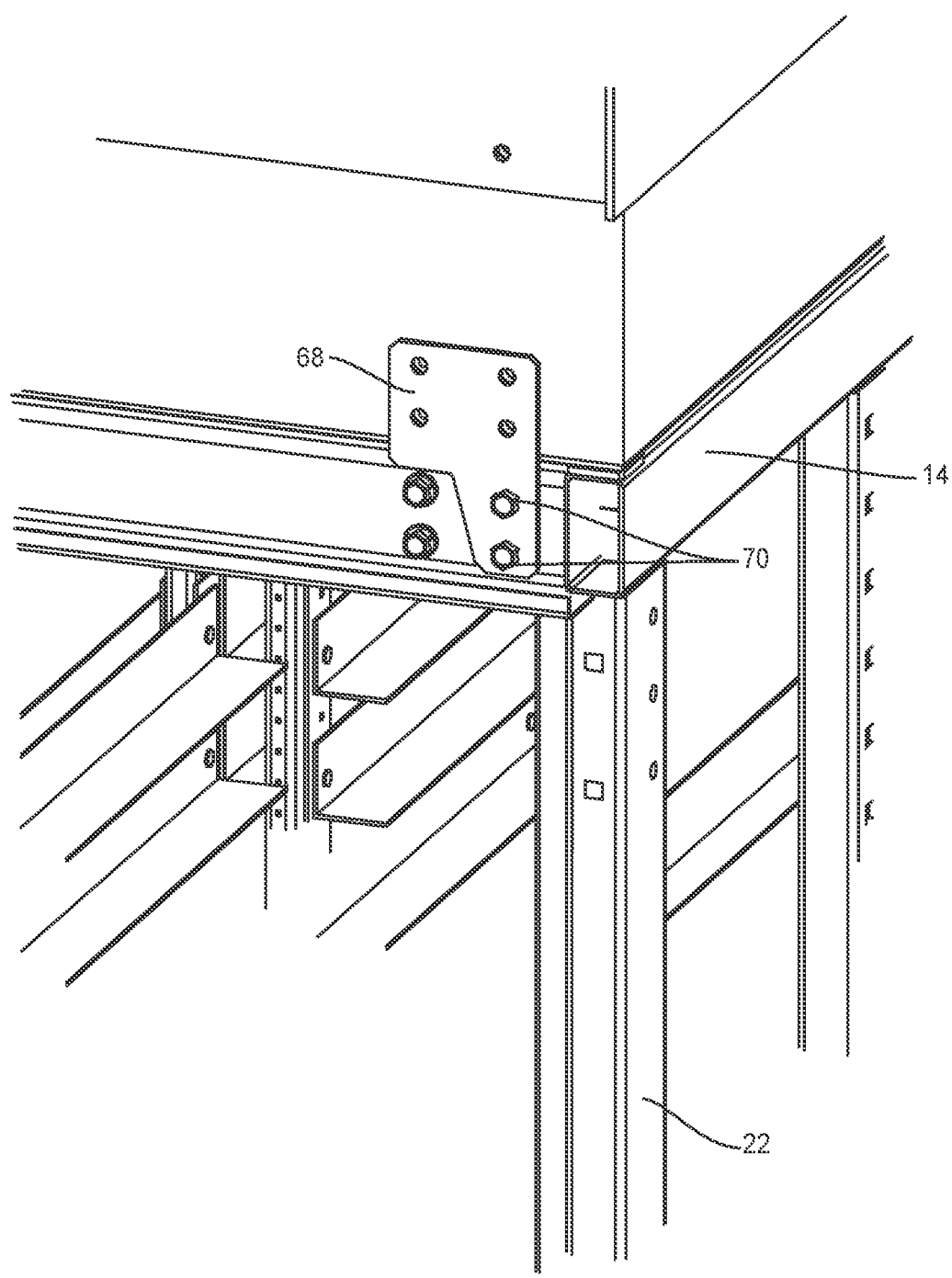
FIG. 6 illustrates an enlarged portion of the ESC module at a location where the roof is fixed to the frame according to one embodiment.

FIG. 6 illustrates an enlarged portion of the ESC module 10 at a location where the roof 64 is fixed to the frame 12 according to one embodiment. In this example, the connection member 68 is coupled to the top perimeter frame 14 via two bolts 70.

Figure 7:
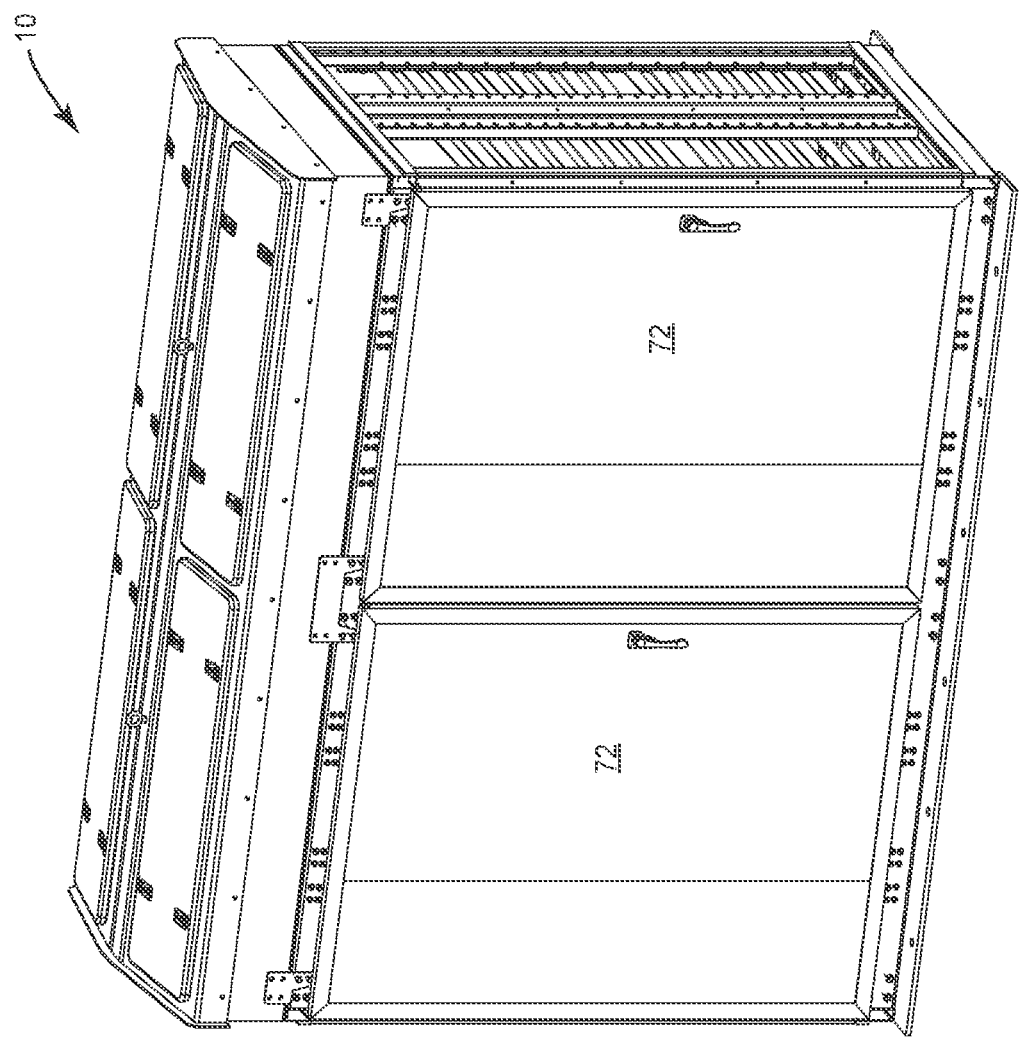
FIG. 7 illustrates the ESC module with a plurality of panels coupled to the ESC module according to one embodiment.

FIG. 7 illustrates the ESC module 10 with a plurality of panels 72 coupled to the ESC module 10. The panels 72 allow a human to access energy storage components that are maintained in the ESC module 10 and eliminate a need to include a void or center aisle in the ESC module 10 that can accommodate a human. The panels 72 also include a seal (not illustrated) to seal the air space in the internal volume of the ESC module 10 from the exterior environment. The panels 72 may comprise, by way of non-limiting example, doors, hatches, curtains, covers, grills, ports, and the like. Among other advantages, by making the ESC module 10 not human-occupiable, the ESC module 10 can be substantially smaller than conventional energy storage systems, and need not comply with ordinances regarding habitable structures. The shelving kits 42, 52, in some embodiments, comprise back-to-back horizontal shelves, such that each horizontal shelf is configured to receive a plurality of energy storage components and configured to facilitate access to the plurality of energy storage components via one of the plurality of panels 72. In some embodiments, however, the panels 72 on one side of the ESC module 10 may facilitate access to the energy storage components, and the panels 72 on the opposite side of the ESC module 10 may be used for maintenance, installation, and the like.

Figure 8:
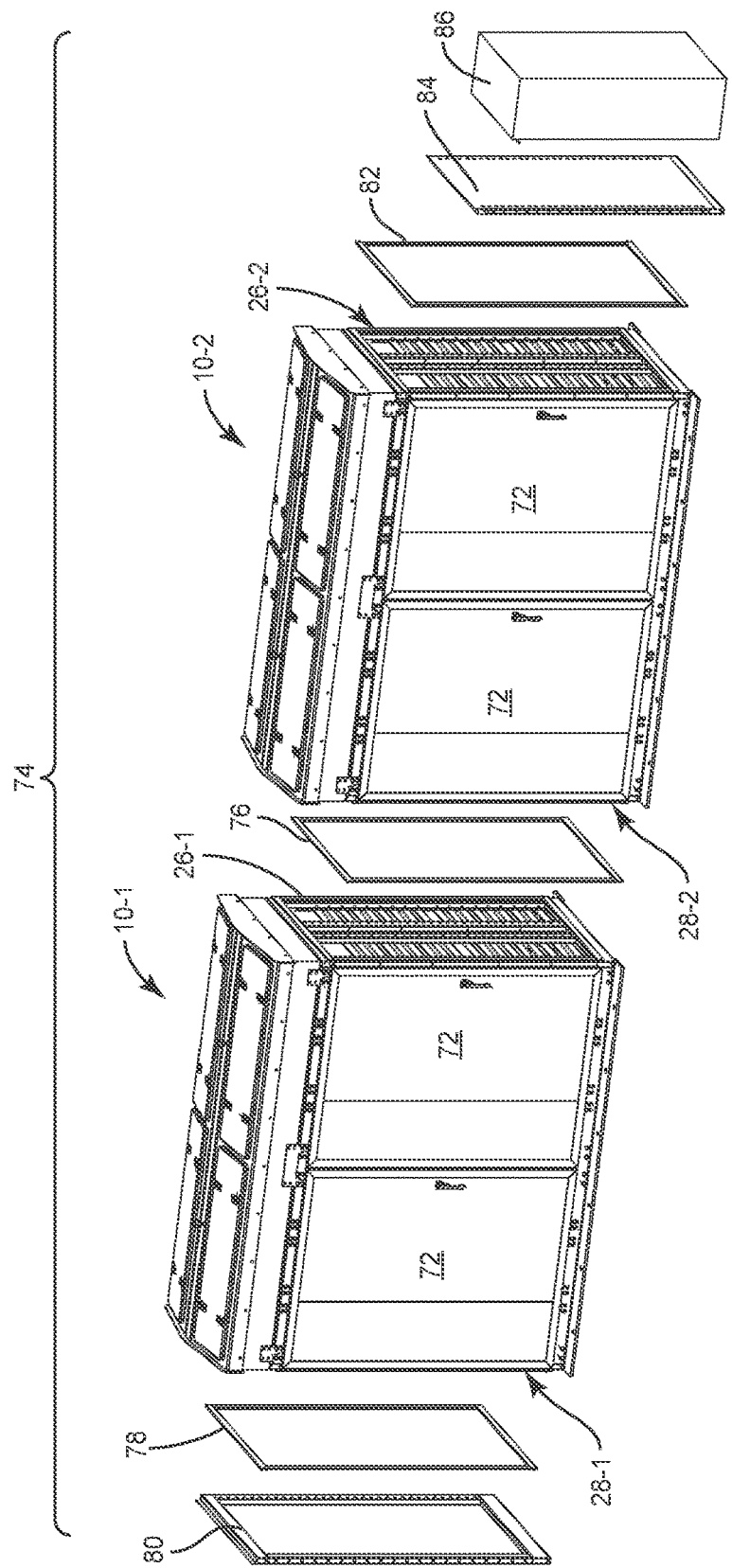
FIG. 8 illustrates a plurality of ESC modules positioned to be coupled together to form an ESC enclosure according to one embodiment.

FIG. 8 illustrates a first ESC module 10-1 and a second ESC module 10-2 positioned to be coupled together to form an ESC enclosure 74, according to one embodiment. The first and second ESC modules 10-1, 10-2 are substantially similar to and have the same attributes as the ESC module 10 discussed above. A gasket 76 is positioned between a first side portion 26-1 of the ESC module 10-1 and a second side portion 28-2 of the ESC module 10-2. The gasket 76 can help eliminate air leakage in the shared air space of the ESC enclosure 74. A gasket 78 and an end panel 80 are positioned to be coupled to a second side portion 28-1 of the ESC module 10-1. A gasket 82, an end panel 84, and a power module 86 is positioned to be coupled to the first side portion 26-2 of the ESC module 10-2. The power module 86 is configured to provide electrical connectivity to first power busses 58 from outside the shared air space. The power module 86 may also house a control system that is coupled to the sensors 61-1-61-3, and that may, based on data received from one or more of the sensors 61-1-61-3, perform certain actions, such as communicating alerts, and the like. The power module 86 may also include rack-level power conversion and power conversion integrated as part of the ESC enclosure 74 that aggregates more than one shelf of energy storage components.

In one embodiment, the ESC enclosure 74 is completely sealed from the exterior environment, preventing water, insects, and air from entering the shared air space. The ESC enclosure 74 also contains any fluids that may have leaked from an energy storage component.

Figure 9:
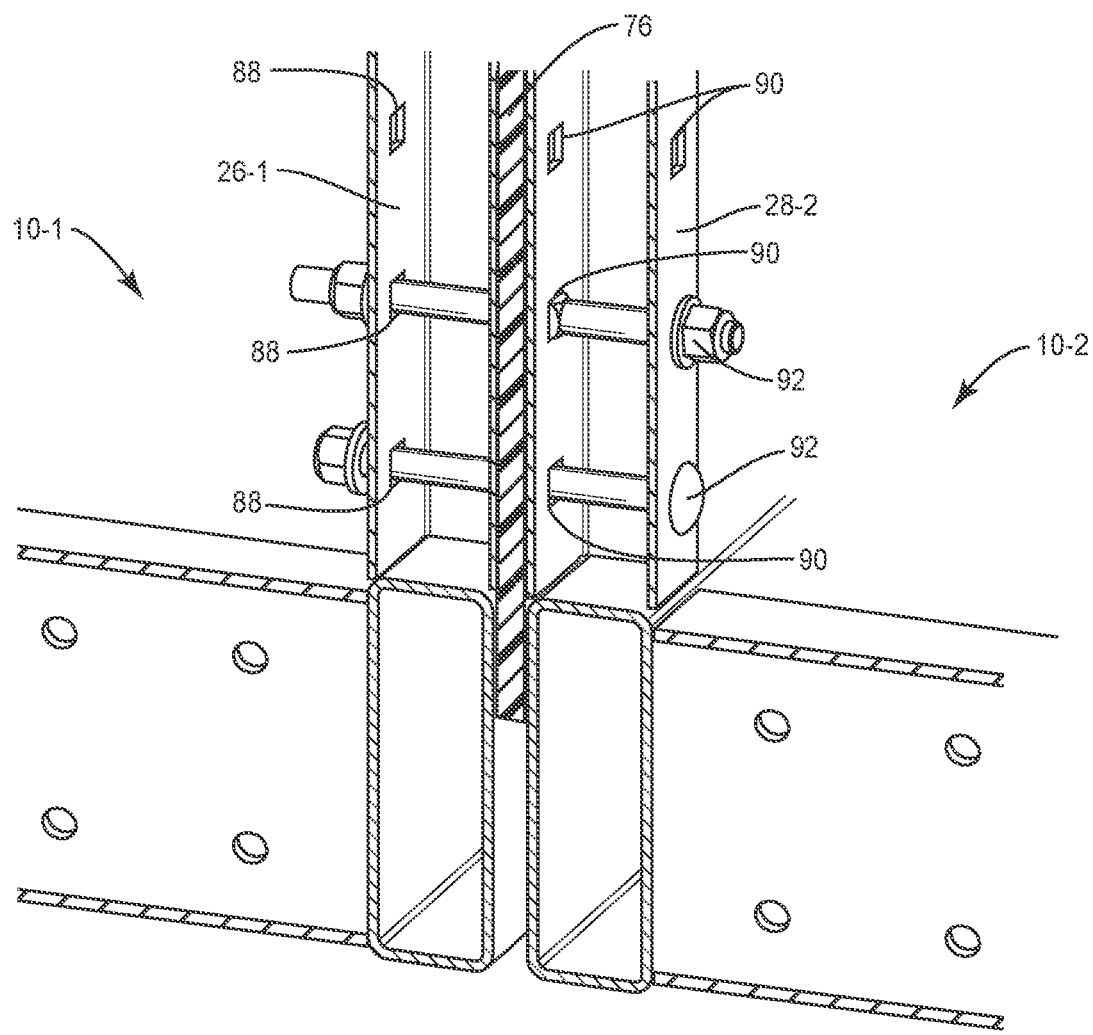
FIG. 9 illustrates a portion of the ESC enclosure at a location wherein a first ESC module is coupled to a second ESC module according to one embodiment.

FIG. 9 illustrates a section of the ESC enclosure 74 at a location wherein the first ESC module 10-1 is coupled to the second ESC module 10-2. The first side portion 26-1 has a plurality of side fastening mechanisms in the form of a plurality of openings 88. Similarly, the second side portion 28-2 has a plurality of side fastening mechanisms in the form of a plurality of openings 90. When positioned adjacent to one another the plurality of openings 88 align with the plurality of openings 90. A plurality of fastening mechanisms, such as bolts 92, may be inserted through the plurality of openings 88 and the plurality of openings 90 to couple the ESC module 10-1 to the ESC module 10-2.

In one embodiment, the gasket 76 forms a plurality of openings that align with the openings 88 in the first side portion 26-1 of the first ESC module 10-1 and with the openings 90 in the second side portion 28-2 of the second ESC module 10-2 to facilitate passage of corresponding fastening mechanisms such as the bolts 92 through the first side portion 26-1, the gasket 76, and the second side portion 28-2.

Figure 10:
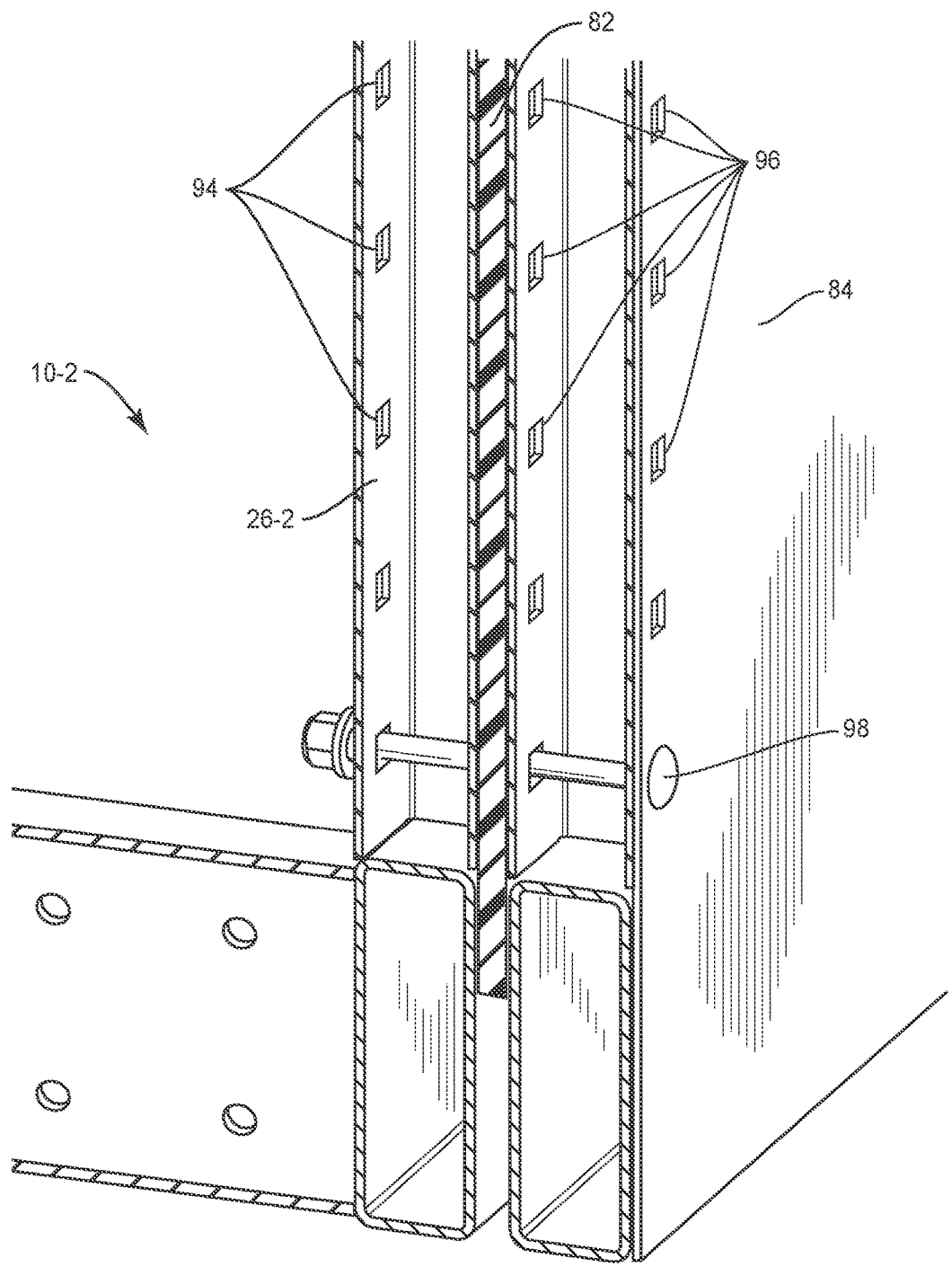
FIG. 10 illustrates a portion of the ESC enclosure at location wherein a gasket and an end panel are coupled to a first side portion of an ESC module according to one embodiment.

FIG. 10 illustrates a section of the ESC enclosure 74 at a location wherein the gasket 82 and the end panel 84 are coupled to the first side portion 26-2 of the ESC module 10-2. The power module 86 has been omitted for purposes of clarity. The first side portion 26-2 forms a plurality of openings 94 that are aligned with openings 96 formed in the end panel 84 to facilitate coupling of the end panel 84 to the first side portion 26-2 via a plurality of bolts 98.

Figure 11:
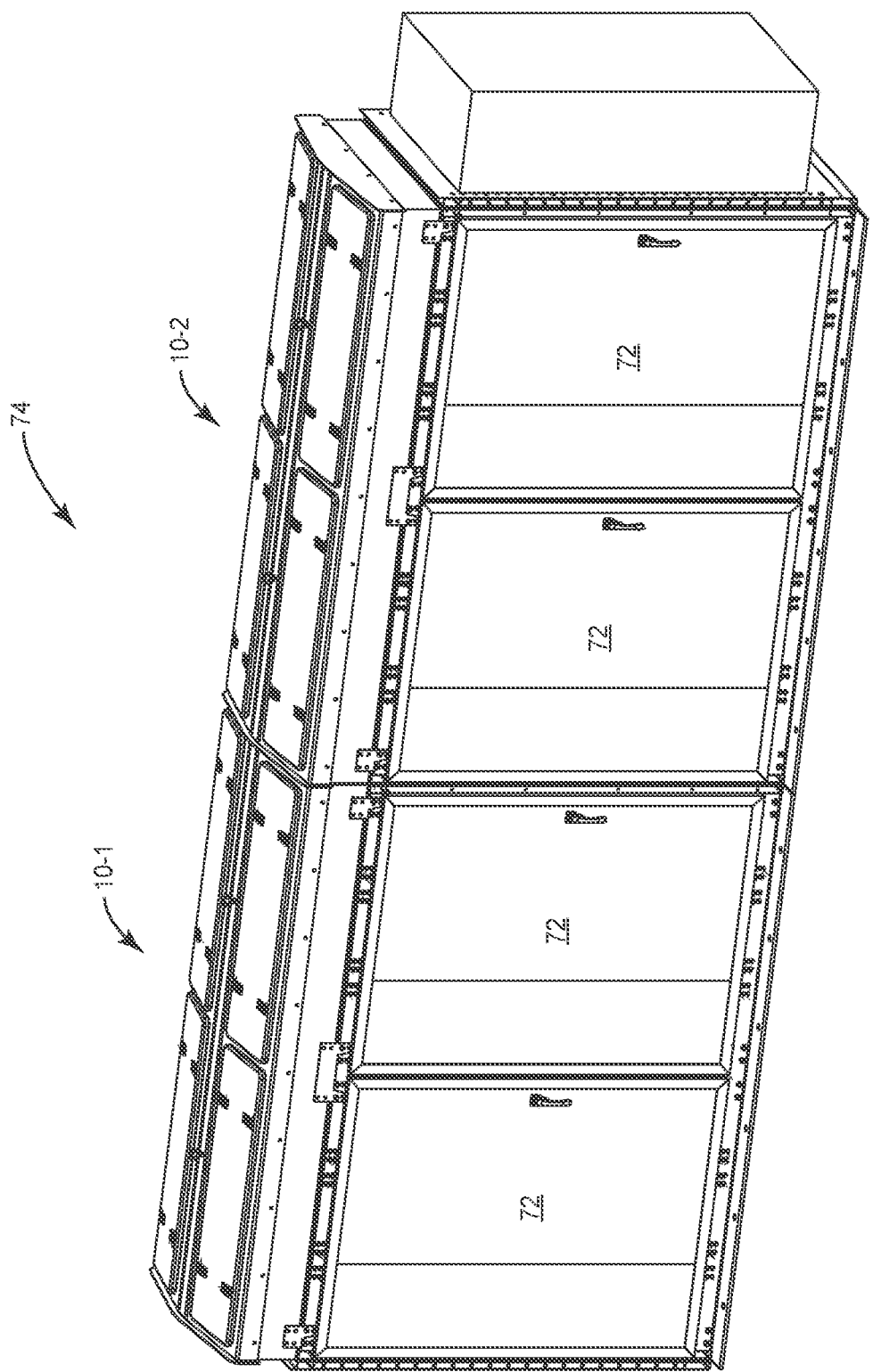
FIG. 11 illustrates the ESC enclosure according to one embodiment.

FIG. 11 illustrates the formed ESC enclosure 74. The ESC enclosure 74 includes a plurality of the removable panels 72 that are coupled completely about the perimeter of the ESC enclosure 74, and facilitate access to energy storage components stored therein. The ESC enclosure 74 forms a single shared air space that can be monitored by sensors, and thermally managed as a whole. The ESC enclosure 74 may be easily extended by, for example, removing the end panel 80 (FIG. 8) and coupling another ESC module 10 to the ESC module 10-1.

Figure 12:
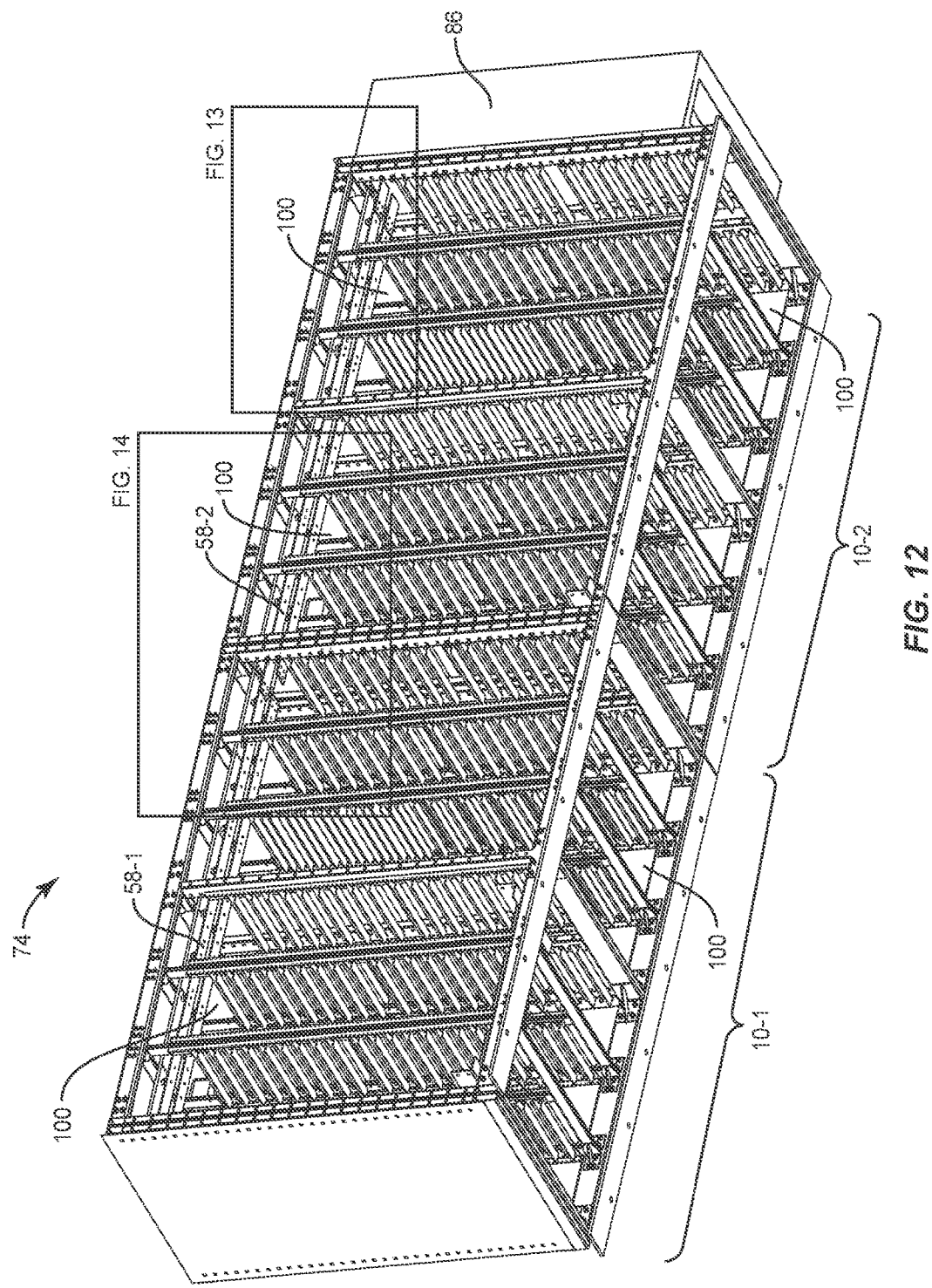
FIG. 12 illustrates the ESC enclosure illustrated in FIG. 11 without any panels so that certain internal features of the ESC enclosure can be viewed.

FIG. 12 illustrates the ESC enclosure 74 illustrated in FIG. 11 without any panels so that certain internal features of the ESC enclosure 74 can be viewed. Among other features, FIG. 12 illustrates a power bus 58-1 of the ESC module 10-1 and a power bus 58-2 of the ESC module 10-2 in a shared air space 100. The power busses 58-1, 58-2 are electrically coupled together and terminate in the power module 86 where electrical connectivity to the power busses 58-1, 58-2 is provided outside the shared air space 100 of the ESC enclosure 74.

Figure 13:
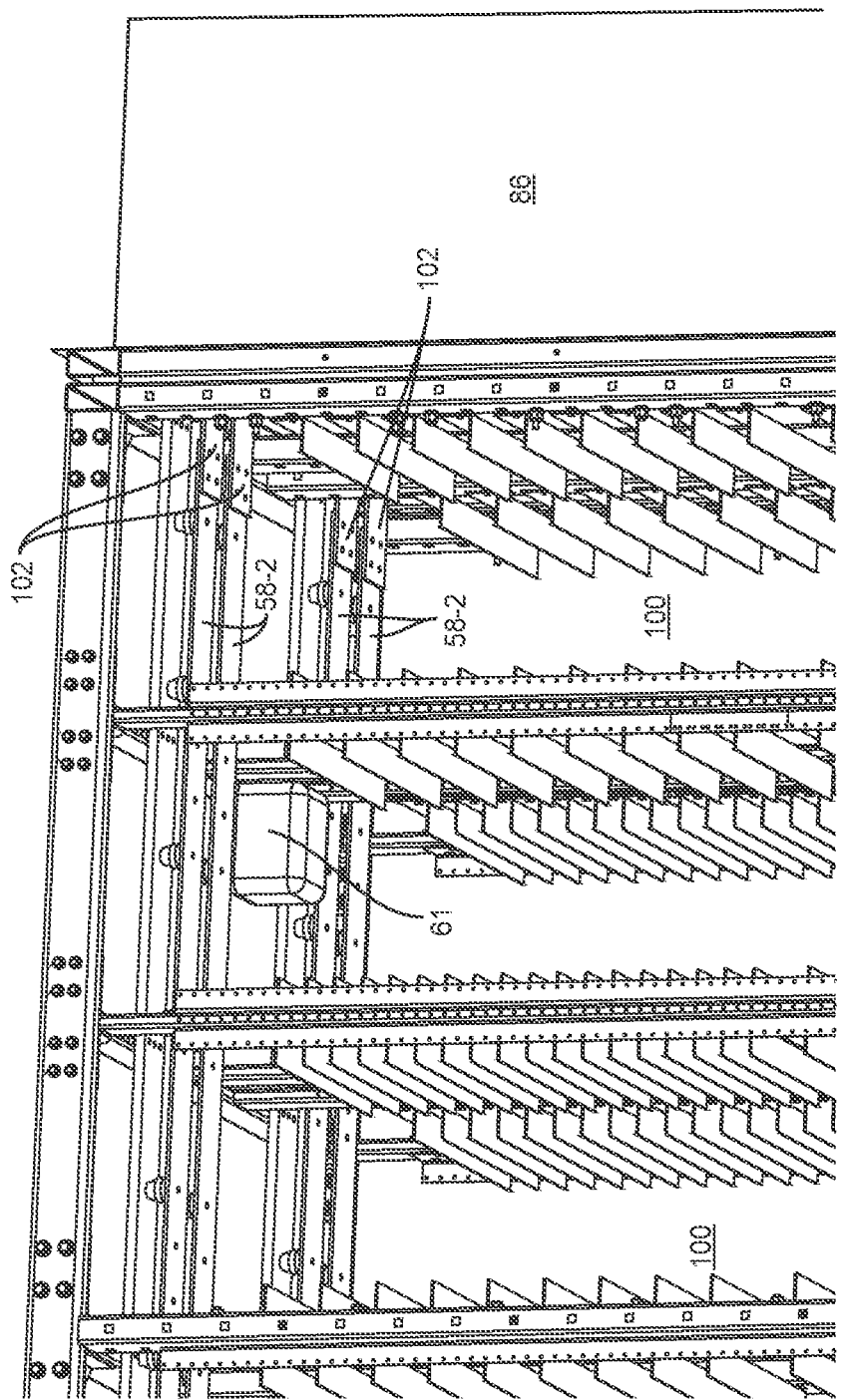
FIG. 13 illustrates an enlarged first portion of FIG. 12 according to one embodiment.

FIG. 13 illustrates an enlarged first portion of FIG. 12 according to one embodiment. The power busses 58-2 are coupled to first ends of a corresponding plurality of bus bar extensions 102. Second ends of the bus bar extensions 102 are coupled to corresponding prongs (not illustrated) that extend from the power module 86, and provide electrical connectivity between the power busses 58-2 and the power module 86. In other embodiments, prongs extend a sufficient distance from the power module 86 to facilitate direct coupling to the power busses 58-2. A sensor 61 senses a characteristic of the shared air space 100. The sensor 61 is communicatively coupled to a control system, which is housed in the power module 86 and which may perform actions based on data generated by the sensor 61.

Figure 14:
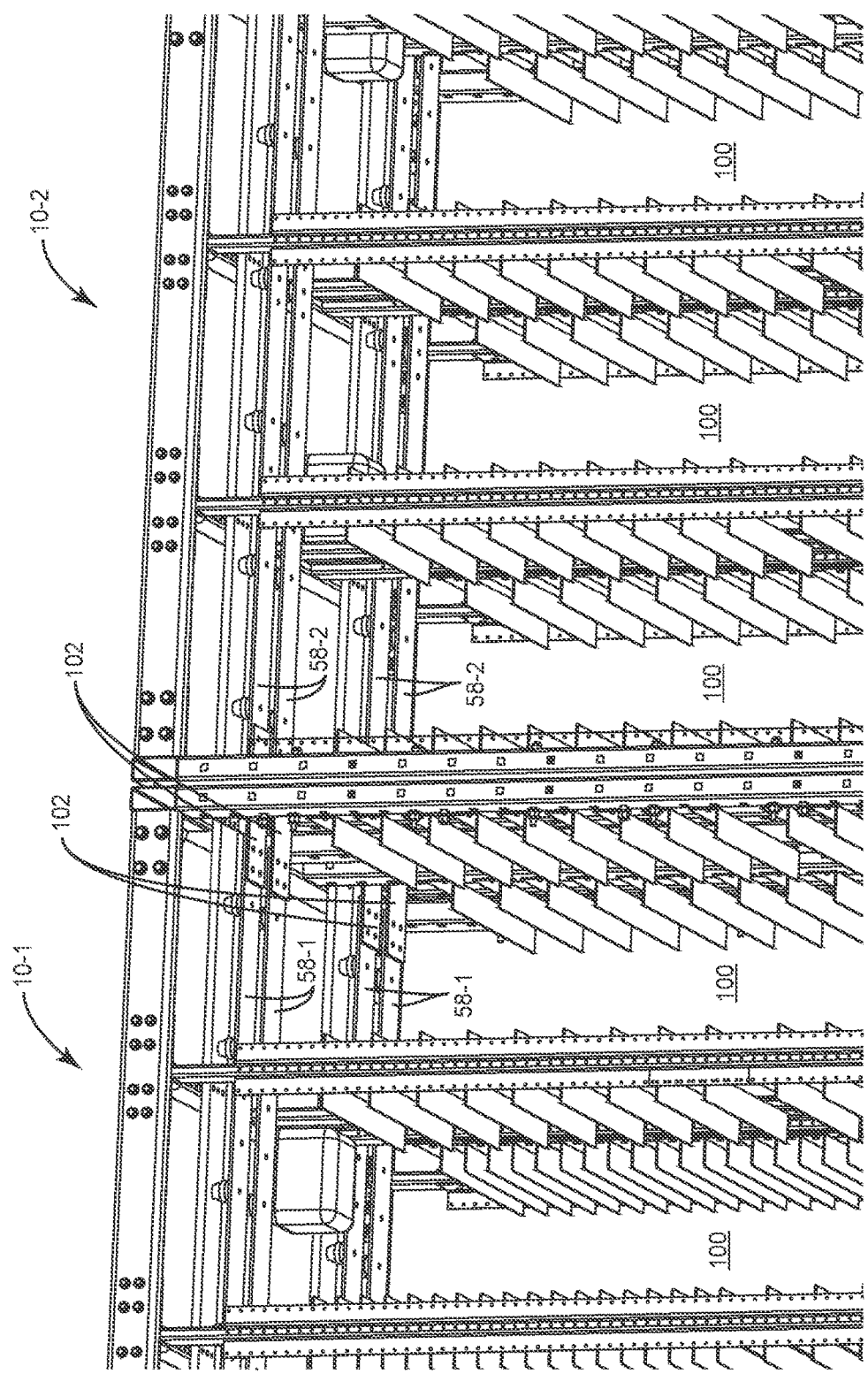
FIG. 14 illustrates an enlarged second portion of FIG. 12 according to one embodiment.

FIG. 14 illustrates an enlarged second portion of FIG. 12 according to one embodiment. A plurality of power busses 58-1 of the ESC module 10-1 are coupled to a corresponding plurality of power busses 58-2 of the ESC module 10-2 by a plurality of bus bar extensions 102. If additional ESC modules 10 are subsequently added to the ESC enclosure 74, the power busses 58-1, 58-2 may be electrically coupled to power busses of such additional ESC modules 10 in a similar manner.

Figure 15:
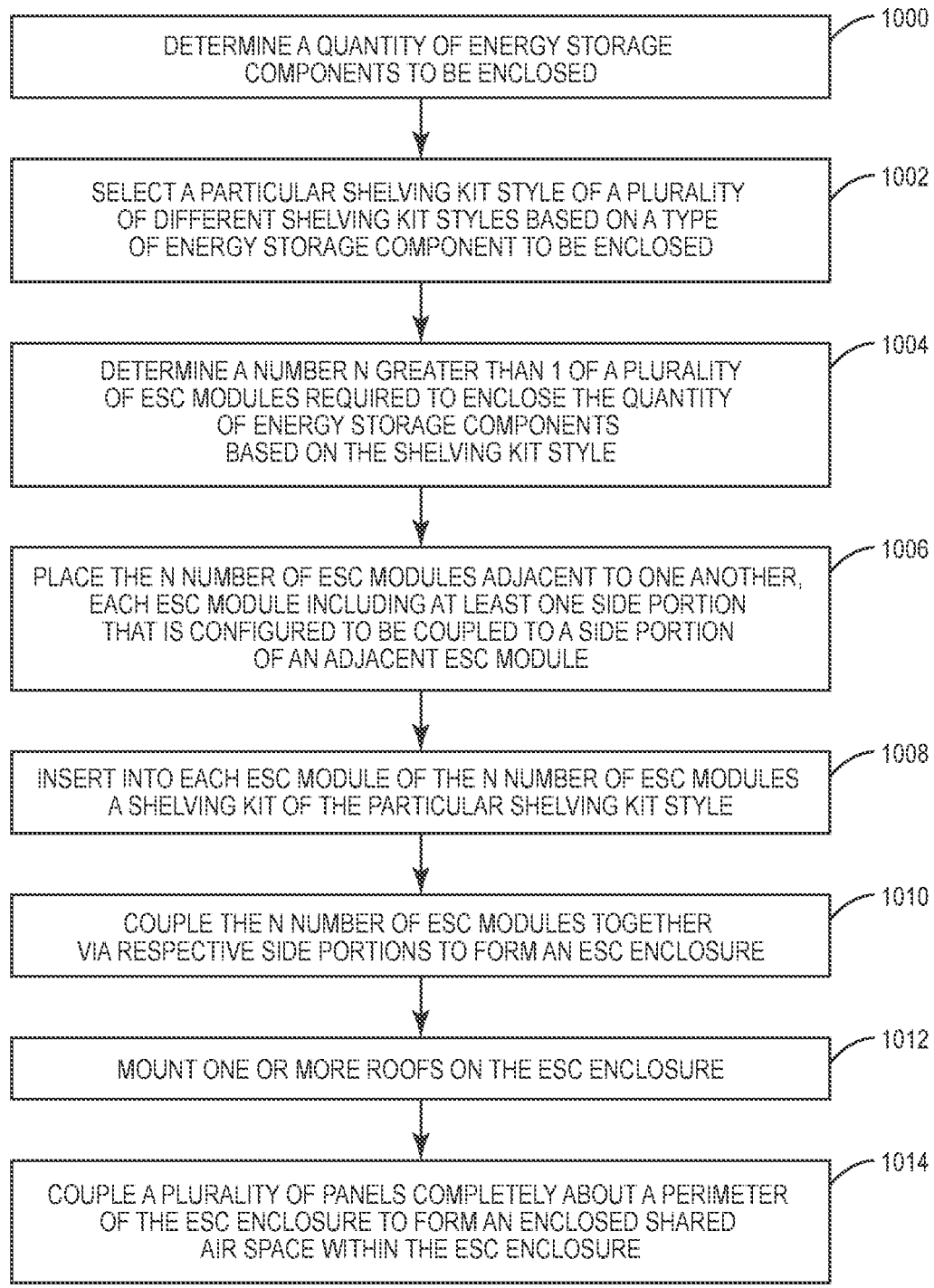
FIG. 15 is a flowchart of a method for assembling the ESC enclosure according to one embodiment.

FIG. 15 is a flowchart of a method for assembling the ESC enclosure 74 according to one embodiment. FIG. 15 will be discussed in conjunction with FIG. 8. Initially, a quantity of energy storage components to be enclosed is determined (FIG. 15, block 1000). The quantity may be based, for example, on a total amount of energy storage that is desired, the particular characteristics of the energy storage components, and any other suitable criteria. A particular shelving kit style of a plurality of different shelving kit styles is selected based on a type of energy storage component to be enclosed (FIG. 15, block 1002). For example, if the energy storage components comprise lithium ion batteries, the first style 40 (FIG. 2) may be selected. If the energy storage components comprise lead acid batteries, the second style 50 (FIG. 3) may be selected. A number N greater than 1 of a plurality of ESC modules 10 required to enclose the quantity of energy storage components based on the shelving kit style is determined (FIG. 15, block 1004). This involves determining how many energy storage components the particular shelving kit style can maintain. For example, if a particular shelving kit style can maintain 100 energy storage components and the desired quantity of energy storage components to maintain is 150, then two ESC modules 10 are required.

The N number (in this example two) of ESC modules 10 are placed adjacent to one another (FIG. 15, block 1006). Each ESC module 10 includes at least one side portion that is configured to be coupled to a side portion of an adjacent ESC module 10. A shelving kit of the particular shelving kit style is inserted into each ESC module 10 (FIG. 15, block 1008). The N number of ESC modules 10 are coupled together via respective side portions to form the ESC enclosure 74 (FIG. 15, block 1010). One or more roofs 64 are mounted on the ESC enclosure 74 (FIG. 15, block 1012). A plurality of panels 72 is coupled completely about a perimeter of the ESC enclosure 74 to form an enclosed shared air space 100 within the ESC enclosure 74 (FIG. 15, block 1014).

Those skilled in the art will recognize improvements and modifications to the preferred embodiments of the disclosure. All such improvements and modifications are considered within the scope of the concepts disclosed herein and the claims that follow.

What is claimed is:

1. A method for assembling an energy storage component (ESC) enclosure comprising:
   determining a quantity of energy storage components to be enclosed;
   selecting a particular shelving kit style of a plurality of different shelving kit styles based on a type of energy storage component to be enclosed;
   determining a number N greater than 1 of a plurality of ESC modules required to enclose the quantity of energy storage components based on the shelving kit style;
   placing the N number of the plurality of ESC modules adjacent to one another, each ESC module including at least one side portion that is configured to be coupled to a side portion of an adjacent ESC module;
   inserting into each ESC module of the N number of the plurality of ESC modules a shelving kit of the particular shelving kit style;
   coupling the N number of the plurality of ESC modules together via respective side portions to form an ESC enclosure;
   mounting a roof on the ESC enclosure; and
   coupling a plurality of panels completely about a perimeter of the ESC enclosure to form an enclosed shared air space within the ESC enclosure.

2. The method of claim 1, further comprising:
   positioning a gasket between a first side portion of a first ESC module of the plurality of ESC modules and a second side portion of a second ESC module of the plurality of ESC modules.

3. The method of claim 2, further comprising:
   wherein positioning the gasket between the first side portion of the first ESC module of the plurality of ESC modules and the second side portion of the second ESC module of the plurality of ESC modules further comprises positioning the gasket between the first side portion of the first ESC module of the plurality of ESC modules and the second side portion of the second ESC module of the plurality of ESC modules, the gasket forming a plurality of openings that align with corresponding openings in the first side portion of the first ESC module and the second side portion of the second ESC module to facilitate passage of corresponding fastening mechanisms through the first side portion of the first ESC module, the gasket, and the second side portion of the second ESC module.

4. The method of claim 1, further comprising:
   coupling a control system to an end of the ESC enclosure;
   mounting a sensor in the shared air space, the sensor identifying a characteristic of the shared air space; and
   coupling the sensor to the control system.

5. The method of claim 4, wherein the sensor comprises one of a smoke sensor, a hydrogen sensor, a humidity sensor, a temperature sensor, and a gas sensor.

6. The method of claim 1, wherein a first ESC module of the plurality of ESC modules comprises a top perimeter frame and a bottom perimeter frame, and wherein inserting into each ESC module of the N number of the plurality of ESC modules the shelving kit of the particular shelving kit style further comprises:
   inserting a first shelving kit into the first ESC module, the first shelving kit comprising a plurality of upright members, each upright member having a top end and a bottom end;
   coupling the top end of each upright member to the top perimeter frame to fix the first shelving kit with respect to the top perimeter frame; and
   coupling the bottom end of each upright member to the bottom perimeter frame to fix the first shelving kit with respect to the bottom perimeter frame.

7. The method of claim 1, wherein a first ESC module of the plurality of ESC modules comprises a central upright structure, a first side, and a second side, the central upright structure comprising a plurality of upright members that extend from a top perimeter frame of the first ESC module to a bottom perimeter frame of the first ESC module, the first side including a plurality of first side members that extend from the top perimeter frame to the bottom perimeter frame, the second side including a plurality of second side members that extend from the top perimeter frame to the bottom perimeter frame, and wherein inserting into each ESC module of the N number of the plurality of ESC modules the shelving kit of the particular shelving kit style comprises:
   inserting a first shelving kit into the first ESC module, the first shelving kit comprising a plurality of shelves, each shelf of the plurality of shelves having a first end member configured to be coupled to the central upright structure and a second end member configured to be coupled to either the first side members or the second side members;

coupling the first end members of the plurality of shelves to the central upright structure to fix the first end members with respect to the central upright structure; and coupling the second end members to either the plurality of first side members or the plurality of second side members to fix the second end members with respect to either the plurality of first side members or the plurality of second side members.

8. The method of claim 1, wherein a first ESC module comprises a first power bus and a second ESC module comprises a second power bus, and further comprising:
   electrically coupling the first power bus to the second power bus.

9. The method of claim 8, wherein electrically coupling the first power bus to the second power bus comprises coupling a first end of a bus bar extension to the first power bus and a second end of the bus bar extension to the second power bus.

10. The method of claim 8, further comprising:
    coupling a power module to an end of the ESC enclosure; and
    coupling the first power bus to the power module;
    wherein the power module is configured to provide electrical connectivity to the first power bus from outside the shared air space.

11. The method of claim 1, wherein the energy storage components comprise batteries.

12. The method of claim 1, wherein the ESC enclosure is devoid of a center aisle.

13. The method of claim 11, wherein each ESC module has a length and a width, and each shelving kit comprises back-to-back horizontal shelves, each horizontal shelf configured to receive a plurality of energy storage components and configured to facilitate access to the plurality of energy storage components via one of the plurality of panels.

14. The method of claim 1, wherein mounting the roof on the ESC enclosure further comprises mounting a roof on each ESC module.

15. The method of claim 1, further comprising mounting a thermal management system in at least one ESC module of the plurality of ESC modules, the thermal management system configured to thermally manage the ESC enclosure.

16. The method of claim 15, wherein the roof comprises a panel, and further comprising accessing the thermal management system via the panel.

17. An energy storage component (ESC) enclosure comprising:
    a plurality of ESC modules, each ESC module including at least one side portion having a plurality of side fastening mechanisms configured to be coupled to an adjacent ESC module, wherein the plurality of ESC modules are coupled together via the plurality of side fastening mechanisms to form an ESC enclosure;
    a plurality of shelving kits, each shelving kit mounted to one of the ESC modules;
    a roof coupled to the plurality of ESC modules; and
    a plurality of panels coupled to the plurality of ESC modules about a perimeter of the ESC enclosure to form a shared air space within the ESC enclosure.

18. The ESC enclosure of claim 17, wherein a first ESC module of the plurality of ESC modules comprises a top perimeter frame and a bottom perimeter frame, and wherein a first shelving kit of the plurality of shelving kits comprises a plurality of upright members, each upright member having a top end and a bottom end;
    wherein the top end of each upright member is coupled to the top perimeter frame to fix the first shelving kit with respect to the top perimeter frame; and
    wherein the bottom end of each upright member is coupled to the bottom perimeter frame to fix the first shelving kit with respect to the bottom perimeter frame.

19. The ESC enclosure of claim 17, wherein a first ESC module comprises a first power bus and a second ESC module comprises a second power bus, and wherein the first power bus is electrically coupled to the second power bus via a bus bar extension.

20. The ESC enclosure of claim 17, further comprising:
    a control system coupled to an end of the ESC enclosure; and
    a sensor mounted in the shared air space, the sensor configured to identify a characteristic of the shared air space; and
    wherein the sensor is communicatively coupled to the control system.

* * * * *